United States Patent Office 3,338,637
Patented Aug. 29, 1967

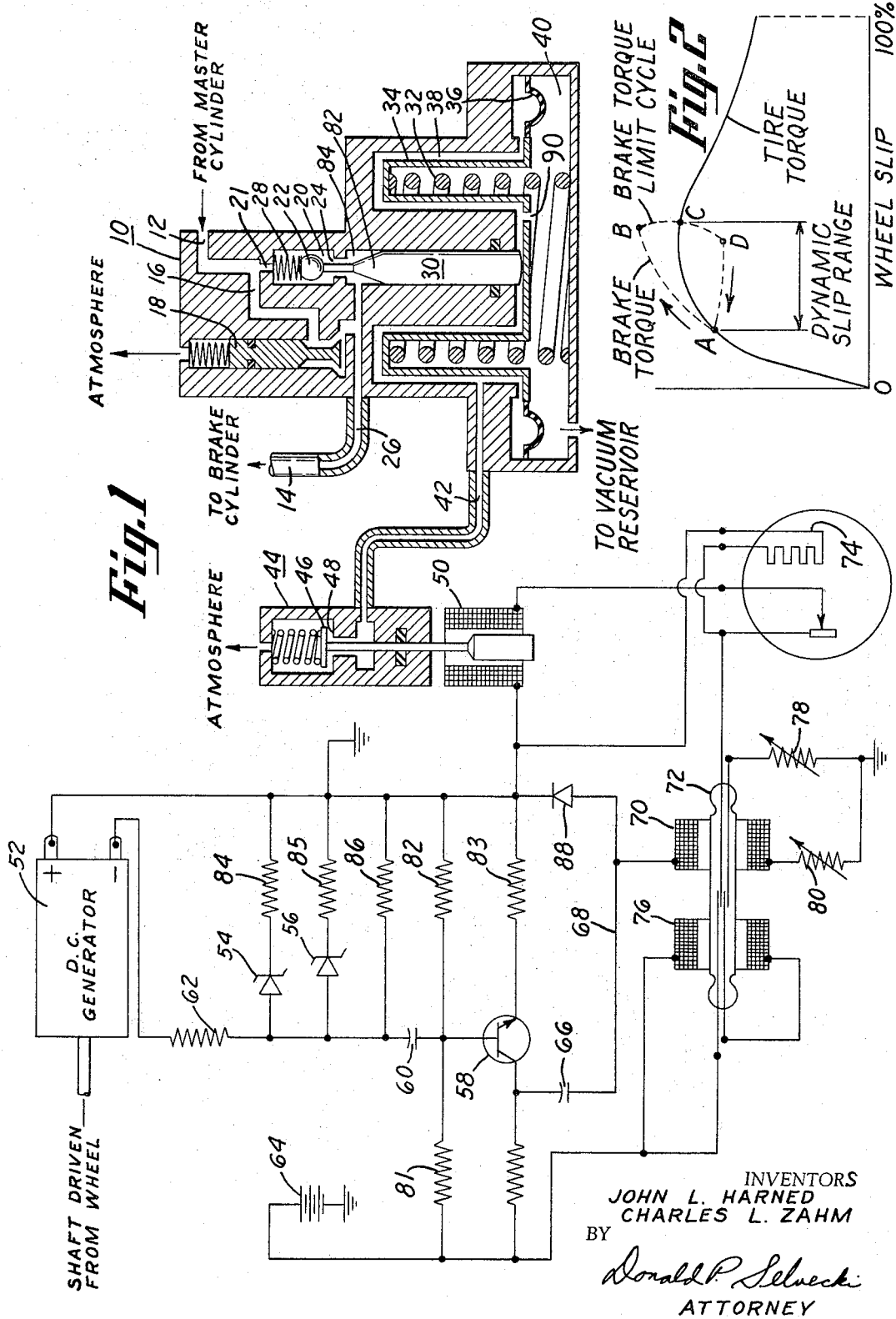

3,338,637
WHEEL SLIP CONTROL TYPE BRAKE ANTI-SKID SYSTEM
John L. Harned, Grosse Pointe Woods, and Charles L. Zahm, Ann Arbor, Mich., assignors to General Motors Corporation, Detroit, Mich., a corporation of Delaware
Filed Feb. 2, 1966, Ser. No. 524,386
3 Claims. (Cl. 303—21)

This invention relates to anti-skid brake controls and more particularly to a device that shuts off braking pressure communication between a master cylinder and selected wheel cylinders in response to an electrical signal generated by the device driven at a speed proportional to vehicle wheel speed.

When a driver applies maximum braking effort during an emergency stop, the wheels very often lock, thereby causing the loss of directional control of the vehicle. Experimental measurements of tire characteristics reveal that a substantial portion of the tire cornering force capability can be retained if the power braking force is held between 90% to 95% of maximum. With conventional driver controlled brakes, it is not possible to regulate the brake pressure with the degree of precision and speed of response needed to achieve this kind of control accuracy. It is desirable to provide an additional brake control device that automatically operates to supplement driver control during emergency braking. This device would provide the necessary control functions to sense when the braked wheel approaches the maximum tire brake force and would act to modulate the brake pressure so as to maintain tire brake force in the 90% to 95% region.

In addition, it would be desirable for such device to reduce vehicle stopping distances during emergency braking under varying road conditions. Measurements of tire friction coefficients, as a function of wheel slip of tires operating on dry, wet and icy road surfaces, show that the locked wheel friction coefficient is substantially less than a maximum value that occurs at an intermediate value of wheel slip somewhere between zero and one-hundred percent slip. This data also shows that the ratio of maximum to locked wheel friction coefficients can vary from between 1.1 to 1.2 for dry pavement all the way up to between 1.5 and 2.0 for wet and ice surfaces.

It is an object of the present invention to provide an improved anti-skid brake control that maintains the braking force during emergency stopping conditions at between 90% to 95% of maximum.

It is another object of the present invention to provide an improved anti-skid brake control that utilizes a signal supplied by a wheel-driven generator to trigger an electrical circuit that in turn repositions a brake pressure control valve.

It is still another object of the present invention to provide an improved anti-skid brake control of the type described in the aforementioned object wherein slight variations from a normally linear output of an electrical generator are filtered with only abrupt variations from a mean linear output utilized to actuate the subject invention.

It is a further object of the present invention to provide an improved anti-skid brake control which utilizes a vacuum suspended valve that has atmospheric pressure selectively bled into a chamber which operates against a spring-loaded diaphragm to selectively shut off brake pressure communication between a master cylinder and a brake cylinder.

It is still a further object of the present invention to provide an improved anti-skid brake control which utilizes electrical means having a normally conductive transistor that is selectively driven non-conductive to operate a reed switch thereby providing a path for electrical power to a solenoid valve setting the anti-skid brake control into operation.

Further objects and advantages of the present invention will be apparent from the following description, reference being had to the accompanying drawings wherein a preferred embodiment of the present invention is clearly shown.

In the drawings:
FIGURE 1 is a sectional view of the hydraulic portion of the subject invention with the associated electrical circuitry being diagrammatically shown;
FIGURE 2 is a graphic illustration of the operation of the subject invention.

Referring to FIGURE 1, a housing 10 carried by a vehicle is illustrated as having an inlet 12 from a master cylinder and an outlet 14 to selected brake wheel cylinders. It is understood that the subject invention can work in conjunction with selected vehicle wheels that are likely to skid due to the effective weight shift during braking or can be mounted on individual wheels to control braking pressure therein. Passage 16 from inlet 12 provides a path for fluid communication between inlet 12 and outlet 14 past by-pass valve 18. Another path for fluid communication from inlet 12 is provided through chamber 20 past ball check valve 22 through orifice 24 into outlet passage 26. Ball check valve 22 is loaded by spring 28 toward a closed position relative to orifice 24 but is normally maintained from its seat by sliding valve 30 biased by the force of spring 32 acting on diaphragm support 34 which, in turn, engages valve 30.

Diaphragm support 34 holds diaphragm 36 operatively positioned to form chamber 38 and chamber 40 in housing 10. Chamber 40 is normally maintained under vacuum pressure from the vacuum reservoir while chamber 38 has atmospheric pressure selectively communicated to it through line 42 from second valve means 44. Second valve means 44 includes poppet valve 46 movable off seat 48 in response to solenoid 50. Solenoid 50 is powered in a manner to be hereinafter described.

The D.C. generator 52 is driven by a selected vehicle wheel at a rotational speed proportional thereto. Therefore, the output of generator 52 is directly proportional to the angular velocity of the wheel and normally generates a voltage having a linear amplitude relationship with respect to wheel velocity. This voltage of course increases and decreases in amplitude in a manner proportional to vehicle wheel speed. However, the subject device does not respond to static or quasi-static variations of wheel speed due to the high-pass filter formed by capacitor 60, resistors 62, 82, 83 and 86 and by resistors 84 and 85 when Zener diodes 54 and 56 conduct. The high-pass filter attenuates generator 52 voltage variations having frequencies of 1.0 cycle per second and lower so that these low frequency variations do not appear at the base of transistor 58. As such, the filter performs a differentiating function and produces an output proportional to the rate of change in the input. Therefore, the filter output represents acceleration (or deceleration) rather than velocity. The function of Zener diodes 54 and 56 is to reshape the normal linear relationship into a predetermined non-linear relationship that increases sensitivity to wheel velocity variations as the vehicle slows down. Transistor 58 is an N-P-N type and is normally conducting in class A operation due to a positive polarity at the base imposed by resistors 81, 82 and 83. During normal operation of the vehicle's braking system, electrical power from battery 64 passes through transistor 58 which is conducting and goes directly to ground. Therefore, the solenoid valve is normally non-energized.

During operation of the subject system, when a variation in output from the D.C. generator is sensed in a manner to be hereinafter described, an alternate path of current flow is established which results in energization of the solenoid valve. This path for current flow is through capacitor 66, lead 68, through coil 70 and variable resistor 80 to ground. Energization of coil 70 closes reed switch 72 and provides another path for current flow through reed switch 72 through thermal delay protective device 74 to solenoid 50 to ground. Biasing coil 76 is also energized when reed switch 72 is closed and is arranged to create a magnetic flux opposing that of coil 70. Variable resistor 78 is in the circuit to coil 76 and will control the rate of flux built up therein and coil 70 is similarly controlled by variable resistor 80. Coils 70 and 76 in combination with the two sets of switch contacts of reed switch 72 form an electro-mechanical logic element that performs a logic required for the operation of the subject system.

In operation, the anti-skid valving mechanism comprising a first valve means 30, second valve means 44, and by-pass valve 18, functions to shut off braking pressure to vehicle wheels encountering an incipient skid condition. By-pass valve 18 allows an orifice to be inserted in the brake line. During periods of time that normal braking pressure is communicated to inlet 12, passage 16 and chamber 20 along with by-pass valve 18 to regulate brake pressure positive rates being applied by a vehicle operator. This pressure is thereafter communicated to outlet passage 26 to outlet 14 to provide a braking pressure at the vehicle wheel cylinders. As long as normal braking is carried out, the subject anti-skid system does not function to cut off braking pressure.

However, when braking pressure is developed at inlet 12 that would tend to lock the vehicle wheels, this condition is sensed by the vehicle wheel slip error sensing means and solenoid 50 is caused to operate opening poppet valve 46. The opening of poppet valve 46 vents atmospheric pressure through line 42 into chamber 38. Spring 32 bears against diaphragm support 34 and normally resists vacuum in chamber 40. With the admission of atmospheric pressure to chamber 38, movement of diaphragm 36 results in the direction of chamber 40. As diaphragm 36 moves, valve 30 follows this movement and ball check valve 22 is moved toward its seat closing off orifice 24. During the initial portion of the braking pressure build-up at inlet 12, braking pressure is communicated through passage 16 past by-pass valve 18 to outlet passage 26. When the biasing force of the brake return spring has been overcome and contact is made with the brake drum, pressure has advanced sufficiently in the system to close by-pass valve 18. Thereafter, all braking pressure is communicated through control orifice 21 past the still unseated ball check valve 22 into outlet passage 26. When sufficient movement of diaphragm 36 is had, ball check valve 22 completely closes off orifice 24 resulting in the cutting off of further pressure build-up at the wheel cylinders. In addition, as diaphragm 36 moves even further, substantially conical portion 82 of valve 30 moves in chamber 84 enlarging said chamber resulting in a decrease of the brake pressure trapped on the wheel cylinder side of ball check valve 22. Therefore, the affected vehicle wheel having reached the incipient skid condition is allowed to accelerate thereby overcoming the skid tendency.

The aforementioned cycle is repeated very rapidly, for example, at the rate of ten cycles per second to impose a pressure pattern of a controlled nature at the affected wheel cylinder rather than actually cutting off braking pressure for substantial periods of time. The cycling of the subject mechanism is controlled by the D.C. generator 52 and associated electronic circuitry.

The D.C. generator 52 is driven by a shaft from the wheel of the controlled vehicle wheel and has an output linear in amplitude with respect thereto. This linear output is modified by Zener diodes 54 and 56 to reshape the generator output signal to conform to a predetermined non-linear relationship to wheel speed. As the vehicle wheel varies in speed during normal operation of the vehicle, there is a variation in the output wave amplitude from D.C. generator 52 but this is not sufficient to actuate the subject mechanism due to the high pass filter circuit working in conjunction with transistor 58. When the dynamic voltage signal is radically changed in shape as a vehicle wheel approaches a locked condition, the drop in voltage from the generator is sufficient to allow capacitor 60 to discharge. As capacitor 60 discharges, the polarity at the base of transistor 58 changes to a more positive potential thereby making the transistor 58 completely conductive. When transistor 58 goes conductive, a discharge of capacitor 66 through transistor 58 is experienced resulting in a discharging of the capacitor 66 through variable resistor 80 and coil 70. During this discharge period, coil 70 is momentarily energized. Reed switch 72 immediately closes providing a path for current flow from battery 64 through solenoid 50 to ground. As solenoid 50 operates, the aforementioned cycle of the valving in housing 10 takes place.

Contemporaneous with the discharging of capacitor 66, coil 76 is energized and is biased in opposition to coil 70. With the energization of coil 76, it overrides the closing tendency of coil 70 resulting in reed switch 72 opening when the current through coil 70 has dropped to about 75% of the cut-in value. This drop in coil 70 current is caused by generator 52 speeding up due to wheel acceleration resulting from brake pressure reduction. The opening of reed switch 72 results in solenoid 50 being de-energized, returning the circuit to the static condition.

As the vehicle wheel braking pressure is relieved, D.C. generator 52 speeds up resulting in capacitor 60 going more negative; that is, the charge across the capacitor becomes increasingly negative with respect to ground, thereby causing transistor 58 to go back to class A operation. When transistor 58 goes into class A operation and the charge across capacitor 66 goes more negative, the electrical circuit is in a condition awaiting another dynamic voltage impulse through the high pass filter that results in another cycling of the subject mechanism. Diode 88 provides a charge path for capacitor 66 directly to ground instead of through coil 70.

System operation is explained graphically in FIGURE 2 wherein tire torque or the force of the tires acting on a road surface and brake torque, the force acting on the brake drum, are ploted against percent of wheel slip. A certain amount of wheel slip is to be tolerated during a normal braking action but excessive slip results in wheel skid. The purpose of the subject device is to maintain wheel slip within tolerable limits as denoted on the graph as a dynamic slip range.

Referring to the graph in FIGURE 2, as the brakes are applied tire torque and brake torque advance in line until point A is reached. If braking is continued at a given pressure input from this point, brake torque increases toward point B but tire torque increases toward point C while wheel slip increases practically in a straight line. Tire torque eventually decreases due to the increase in wheel slip caused by a sliding tire that is, of course, rapidly decreasing in rotational velocity. This is the incipient skid condition and the D.C. generator 52 creates a signal which is sent to a circuit which senses this dynamic change in wheel slip. A signal is generated and amplitude modified by Zener diodes 54 and 56, as previously described, to drive transistor 58 from class A operation toward a cascade condition. Point B on the graph illustrates the point at which transistor 58 goes completely conductive resulting in the energization of coil 50 and the initiation of operation of the brake pressure modulator.

When brake pressure is cut off, brake torque falls off toward point C where wheel deceleration has decreased to zero. From point C to point D brake torque decreases further and wheel acceleration is initiated. When point D is reached, wheel slip is again radically affected in a decreasing manner and the signal from D.C. generator 52 is altered resulting in a restabilization of capacitor 60 and the base of transistor 58 going less positive resuming class A operation thereof.

A uniformly increasing brake pressure rate is reinstated by the bleed through diaphragm orifice 90 and point A is reached for the recycling to be initiated. It is to be noted that the subject device responded to an increasing dynamic wheel slip variation to initiate the operating cycle to prevent an imminent wheel skid and responded to a decreasing dynamic wheel slip variation to end an operating cycle when an acceptable given percent of wheel slip is experienced.

It should be understood that the cycling of the subject mechanism is very rapid which causes a series of pressure pulses to be felt in chambers 38, 40 and a pressure change impulse to be felt in the brake cylinder. Therefore, the incipient skid condition is altered by a constant reduction of the braking pressure due to the oscillation of the solenoid valve and does not take place at once. In this manner, 90% to 95% of the effective braking pressure is maintained at the brake cylinder resulting in a vehicle equipped with the subject mechanism having a minimum stopping distance capability. It should also be understood that the normally linear output of the D.C. generator 52 is altered as amplitude by Zener diodes 54 and 56 in order to increase the response rate of the subject mechanism at low vehicle speeds. It should also be noted that a certain output variation from the D.C. generator is tolerated without cutting off braking pressure where only radical changes in the output are passed by the high pass filter circuit allowing the subject device to go into operation.

The subject mechanism is also equipped with a thermal delay protection device 74 which develops a higher temperature during periods of time when reed switch 72 is closed and, if for some reason remains closed for an inordinate length of time, will overheat and break the circuit to solenoid 50. In this manner, a prolonged shut-off of braking pressure is prevented which itself would involve a dangerous situation.

An important feature of the subject device is the control of the coil 76 through resistor 78 which causes reed switch drop-out at approximately 50% to 75% of cut-in voltage as opposed to the normal 15% of cut-in voltage normally allowing drop-out of a reed switch. This of course, allows faster cycling of the subject system and dampens the pressure pulses to the wheel cylinder. Variable resistor 80 controls the cut-in point of coil 70 so it is clear that the response of the present invention can be easily controlled.

While the embodiment of the present invention as herein disclosed constitutes a preferred form, it is understood that other forms might be adopted.

What is claimed is as follows:
1. An anti-skid for vehicle wheels having hydraulic brake motors comprising the combination of:
   hydraulic valve means for fluid connection between a master cylinder and a brake motor and having a normally open configuration;
   electric current responsive control means operatively connected to urge the valve means toward a closed configuration when energized;
   a voltage generator having a pair of output terminals and drivably engageable with a wheel to produce across said terminals a voltage proportional to the angular velocity of the wheel;
   filter means for receiving said voltage and for producing an output related to the rate of decrease thereof;
   a source of electrical current;
   first and second solenoid-controlled switches having a normally open circuit configuration, the first switch connected in a first series circuit with the source and the control means;
   first solenoid circuit means connected in a second series circuit between the source and the second switch;
   second solenoid circuit means connected to receive the output of the filter means and the first solenoid means; for closing the switch in response thereto, thereby energizing the control means;
   said first solenoid means operatively opposing the second solenoid means thereby to rapidly reopen the first and second switches following closing thereof, thereby to rapidly cycle the valve means between a closed configuration and an open configuration.

2. Apparatus as defined in claim 1 further including thermally responsive switch means connected in said first series circuit in a normally closed circuit state, but responsive to a predetermined current-time integral to become open circuited thereby de-energizing the control means.

3. Apparatus as defined in claim 1 further including the series combination of a resistor and a Zener diode connected across said output terminals to limit the voltage applied to the filter means when the generator is driven at a relatively high speed.

References Cited
UNITED STATES PATENTS

| | | |
|---|---|---|
| 2,711,230 | 6/1955 | Wilson. |
| 2,924,306 | 2/1960 | Martin _____ 303—24 XR |
| 3,017,145 | 1/1962 | Yarber. |
| 3,223,459 | 12/1965 | Packer _____ 303—21 |

EUGENE G. BOTZ, *Primary Examiner.*